Oct. 29, 1963  R. S. COOMBS  3,109,158
AUTOMATIC SIGNALING SYSTEM FOR MOTOR VEHICLES
Filed April 24, 1961
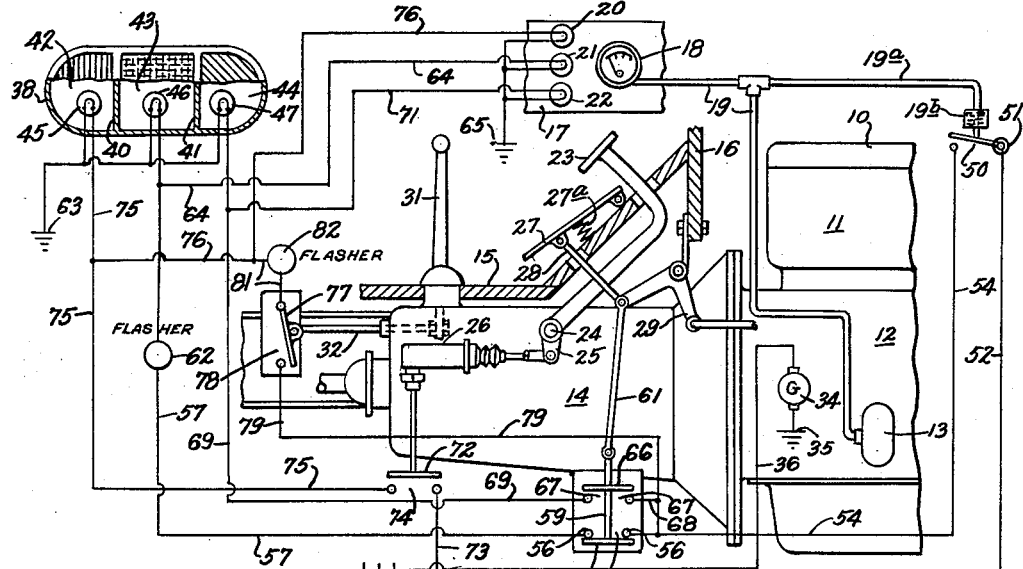
Fig.1.
Fig.2.
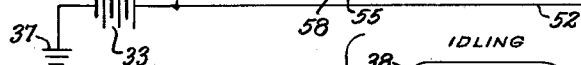
IDLING
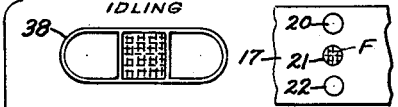
ACCELERATING-CAR IN MOTION
DECELERATING-CAR IN MOTION
DECELERATING-FOOT ON BRAKE
ACCELERATING-IN REVERSE
Fig.3.
INVENTOR.
ROBERT S. COOMBS
BY
ATTORNEY.

United States Patent Office 3,109,158
Patented Oct. 29, 1963

3,109,158
AUTOMATIC SIGNALING SYSTEM FOR MOTOR VEHICLES
Robert S. Coombs, 165 3rd Ave., San Francisco 18, Calif.; by decree of distribution to Natalie M. Coombs
Filed Apr. 24, 1961, Ser. No. 105,131
5 Claims. (Cl. 340—66)

This invention relates to automatic signal systems for motor vehicles, and more particularly relates to such signal systems which are automatically responsive to the normal operations of the vehicle driver to advise and warn the driver of a following vehicle, or a pedestrian, of the operating status of the subject vehicle, and simultaneously to advise the operator of the subject vehicle whether the signals are actually in operative normal working condition, the invention being particularly adapted to vehicles having an internal combustion engine including an oil pump in its lubricating system.

This invention is related to my prior patent Reissue No. 23,719, dated October 6, 1953, now U.S. Patent No. 3,075,162, being reissue of original Patent No. 2,513,712 dated July 4, 1950.

The behavioristic attitude of drivers of motor vehicles presents problems in existing congested and high-speed traffic conditions, both errors of ommission and commission, delayed or incorrect arm or mechanical signalling, failure to signal, parking with motor running, and then moving suddenly into the moving traffic, moving backward without indication of such intent, as well as many other hazards resulting from error of the human element. But of equal importance to the driver of a vehicle is a visible indication to him that various signals on which he is depending for automatic operation, are in fact operative.

Among the objects of the present invention is to provide a visual indicating means on the rear exposed portion of a motor vehicle for indicating to a following driver certain operational conditions present in the preceding vehicle, and to indicate by visual signals any change in the normal controls of the motor, accelerator, brakes, reversing gears, and oil pump.

A further object is to interpose in the battery circuit a switch normally open when the motor is at rest and closable for contact in the signalling circuit at all times that the motor of the vehicle is in operation.

A still further object is to provide in the driver's compartment visual signals on the instrument panel board for indicating to the driver that the various signals at the rear of the vehicle are properly operating.

With the foregoing and other objects in view, as will more fully appear, one preferred form in which the invention may be exemplified is set forth in the following specification and illustrated in the accompanying drawing which is made a part hereof.

In the drawing:

FIG. 1 is a diagrammatic view of an electric circuit employing the invention, the view schematically including parts of the motor vehicle.

FIG. 2 is a series of diagrammatic views with explanatory legends indicating color combinations of various signals under operating conditions as such signals would appear at the rear of the vehicle, and the corresponding signal on the instrument panel of the driver's compartment, the symbol F indicating a flashing signal.

FIG. 3 is a rear view of a motor vehicle showing the conventional direction indicator and clearance signal lights, and a suggested convenient mounting of the rear signal lights of the present invention.

Referring to the drawing in which similar reference characters indicate corresponding parts in the several views, 10 indicates generally an internal combustion engine power unit of a motor vehicle having cylinder block 11, crank case 12, including conventional oil pump 13, and gear case 14. Manifestly, the vehicle has the usual traction wheels and wheel brakes.

The driver's compartment is provided with usual facilities such as suitable floor board 15 and cowl board 16, the latter including an instrument panel 17 upon which are mounted convenient to sight of driver an oil pressure gauge 18 which has an oil pressure conduit 19 connected thereto and communicating with the oil pump 13. There is a branch oil pressure conduit 19a communicating at one of its ends with the oil pressure conduit 19, and thereby having a substantially similar oil pressure as shown by the oil pressure gauge. This branch conduit 19a extends to and operates a suitable pressure-sensitive piston 19b to close a switch in an operating electric circuit, as will be further described.

The instrument panel has three, preferably small, indicator pilot lights, which may be respectively colored red 20, yellow 21, and green 22, and signal lights of corresponding colors are also shown diagrammatically in the drawing in the diagram of the electric circuit for correspondingly colored indicating signal lights hereafter described.

In the driver's compartment there is the usual "running" brake-foot pedal 23 (as distinguished from the parking brake also sometimes operated by a foot pedal). The foot brake is pivoted at 24 and providing a leverage link 25 for reciprocating the piston of a brake-switch cylinder 26. Also there is the conventional accelerator or foot pedal 27 for fuel hinged against tension of spring 27a to reciprocate push rod 28 for operating suitable throttle control lever and linkage 29. Gear shift means such as lever 31 in the driving compartment may be of any suitable type, being provided with leverage connection to slidable gear shaft 32 which projects beyond the gear box case 14. For energizing and operating electric circuits, a source of electric current is provided and includes the conventional electric storage battery 33 grounded at 37, and a conventional generator 34 grounded at 35 and having lead 36 feeding in the well known manner into the battery 33.

It may here be stated that all electrical grounds referred to herein are the same ground, which conventionally is the chassis frame of the vehicle.

The signalling system includes, in addition to the lights 20, 21 and 22 of the instrument panel, a plurality of visual lights at the rear of the vehicle for automatically visually interpreting the mechanical functioning of the mechanical apparatus previously described, whereby a driver of a following vehicle may be instantly advised of the driving operations being executed by the driver of the preceding subject vehicle.

These lights of the rear signalling system correspond in number and color with the lights 20, 21 and 22 of the instrument panel, and the lights of corresponding color being parallel in the respective operative electric circuits, and thereby synchronized in operation. It is to be understood that the lights of the signalling system of the present invention are in a separate operative circuit from the usual and well-known headlights of the vehicle as well as clearance lights indicated C and direction indicator light D.

Preferably the assembly of lights of this signalling system includes an enclosing casing 38 which may be mounted preferably on the rear of the vehicle body E or in any suitable place and manner where it will be readily visible from a position rearwardly of the subject vehicle. This casing has relatively spaced partitions 40, 41 which divides the casing into three light-separated sections or compartments 42, 43, 44. At the exposed or sight face of the casing each of these compartments is closed at its sight face by a pane of transparent or translucent glazing material such as glass or plastic, which, respectively, are differently colored in relatively contrasting colors, those employed herein being the colors appropriately representing the light signalling systems almost universally adopted, red indicating a danger stop warning because the brake is being applied or a reverse backward movement of the vehicle is in process, yellow indicating caution, and green indicating "go" or acceleration operation of the motor and the vehicle.

Each of these light compartments has an electric light bulb 45, 46, 47, these lights being in branch circuits by branch sub-circuits to the respective lights of corresponding color on the instrument panel, which, as identified by the reference characters in the drawing, would make in-series pairs of lights, red 45, 20, yellow 46, 21, green 47, 22.

In referring to colored lights it is to be understood that the actual light bulbs in the lights may all be clear and transparent and the colors indicated may be effected by the colored glazing in front of the light bulb.

In operation of the invention electrical circuits are employed in which the operation of the foregoing mechanical elements are automatically effective for the signalling purposes of the invention.

Upon starting of the motor and continuously during the running thereof, the oil pump 13 is actuated in the usual manner by suitable gearing in the crank case of the motor 12 whereby the oil pressure is registered on oil gauge 18 through conduit 19, and simultaneously such pressure is effective through the branch oil pressure conduit 19a and pressure-sensitive piston 19b to close an oil pressure switch 50 for energizing circuits through that switch. When the motor is not running oil pressure is absent and the oil switch is maintained open by any suitable means such as the spring 51, and circuits through that switch are de-energized. One contact or primary side of oil switch 50 has a lead 52 which extends to a connection with the usual pole of the car battery 33. The other or load contact 53 of the oil switch is connected by a lead 54 to other circuits which are grounded to complete a main signal circuit, in conjunction with which are subcircuits as will be described.

The lead 54 extends to a circuit gap 55 between contacts 56 whereby, when the motor is idling and there is no pressure on the accelerator, the gap 55 is closed in a subcircuit with a lead 57 by means of a first accelerator switch plate 58 of a 2-plate accelerator switch 59, said first switch plate 58 closing the contacts 56 between leads 54 and 57 responsive to the conventional tension of accelerator spring 27a exerted through a link 61 which is connected to a swingable arm of the throttle control linkage 29. The lead 57 extends from the gap 55 of said first accelerator switch, to and through the yellow caution light 46 and thence to ground 63. Connected to the lead 57 between the said first accelerator switch and the yellow signal light 46 there is another branch or sub-circuit lead 64 to the yellow pilot light 21 on the instrument panel and thence to a ground 65. Intermediate said first accelerator switch 58 and said branch subcircuit 64, the lead 57 includes a conventional flasher 62, whereby, when said caution light circuit is energized, both of the signal lights 46 and 21 will indicate a flashing signal in unison.

Thus when the motor is idling, such as may occur when an operator is sitting in the vehicle at the curb or when the car is in motion and the motor idling because the accelerator is not depressed, this yellow light gives a flashing signal of caution to the driver of a rearward vehicle. Manifestly these yellow lights cease to have illumination when the gap 55 is open.

When the accelerator pedal 27 and its connected link 61 are depressed, the accelerator switch 59 is simultaneously depressed and thereby breaks contact of the first switch plate 58 and opens the contact gap 55 in the circuit leads 54, 57. Simultaneously with depression of the acceleration pedal a second accelerator switch plate 66 closes a gap 67 in a subcircuit to the green acceleration light 47 and the green pilot light 22 of the instrument panel board, the closed circuit being from the oil pump lead 54 and a branch circuit 68 through the closed gap 67, thence through lead 69 to the green signal light 47 and thence to ground 63. Intermediate the gap 67 and the green signal light 47, the lead 69 has connected thereto an in-series branch or subcircuit 71 to the green pilot light 22 on the instrument panel, and thence to ground 65.

Thus when accelerating the motor such as when pulling out from curb-parking or running free upon the highway, the green signal light indicates to a following vehicle that the subject vehicle is proceeding or intending to proceed under power or accelerated status. This would indicate to a following driver that the leading driver was not contemplating action other than the normal highway driving. If, however, the operator ceases to depress the accelerator, the second switch plate 66 breaks contact and the gap 67 opens responsive to accelerator spring 27a thus breaking the green-light circuit, whereupon the gap 55 is again automatically closed and the flashing yellow light starts operating for an indication of caution to the following driver.

It will therefore be noted that as long as the motor is running, and thereby closing the oil switch 50, the first and second accelerator switches or plates 58, 66 are alternatively operating switches, dependent for respective operation on the action of the accelerator.

A so-called red brake stop warning circuit is operative responsive to pressure on the foot brake pedal 23 to convey a signal that the vehicle is being braked or decelerated, and conveying a "stop" warning to be careful or of danger, as is the usually accepted signification of a red light. The brake pedal 23, operating through leverage link 25 and the pressure piston cylinder 26, controls a switch plate 72 to open and close the so-called red or brake circuit. The brake circuit may have a lead 73 tapped into the power line 52 connected to the battery and providing an independent circuit, so that the brake signal may be operated even when the engine is not running, and also simultaneous with any other signal when the engine is running. The battery lead 52 extends to a gap 74 which is opened and closed by brake switch plate 72. A lead 75 extends from said gap to the red lamp 45 and thence to ground 63. Intermediate the gap 74 and red lamp 45, the lead 75 has an in-series branch lead or sub-circuit 76 through the red pilot light 20 of the instrument panel and thence to ground 65. Since it is customary for the brake pedal to be spring-tensioned to an upward position, the switch plate 72 normally maintains the gap 74 open. This circuit is closed by pressure upon the foot brake pedal and consequent closing of the gap 74 by the switch 72, thus completing a circuit to the red warning lights 45 and 20. However, it is to be noted that normally when the brake pedal 23 is being depressed, the accelerator is not being depressed and therefore the accelerator gap 67 is open and gap 55 is closed by switch plate 58, and therefore if the engine is running, the yellow lamp circuit is closed whereby both the red lamp and the flashing yellow lamp are illuminated simultaneously as long as the brake is being applied.

Another circuit which may be termed a reverse gear circuit is operated by the gear shift means 31 and is arranged to be operative only when oil switch 50 is closed and the gear shift means, shown in this exemplification as a floor board lever 31, is shifted to position wherein the propelled movement of the vehicle will be rearwardly, commonly called reverse gear. In such reverse gear, the gear shaft lever 31, when moved to such reverse position, moves the shaft 32 which is extended from the gear box, whereby a reverse switch 77 actuated by said shaft is moved to close a gap 78 in the reverse gear subcircuit, said circuit having a lead 79 from one or primary contact of said gap to the oil switch power lead 54, and also connecting with both of the accelerator switches 58 and 66. The other or load contact of said switch 77 has a lead 81 including a flasher 82, and beyond said flasher, the lead 81 is tapped into both of the leads 75 and 76 of the circuits of respective red lamps 45 and 20, the leads 75 and 76 being grounded, respectively, at 63 and 65 as previously described.

Thus when the vehicle is stationary and at rest with motor running and gear shift lever at any position other than reverse, the yellow lights 46, 21 will be illuminated and subject to warning flasher 62 as previously described. If then the shift lever 31 is shifted into reverse gear while the motor is running, a circuit will be closed from the oil-switch power lead 54 through the closed reverse switch 77, lead 81 and flasher 82, and through the connected lead 75 to the red signal lamp 45, and through the branch lead 76 to the pilot red lamp 20 on the instrument panel, providing red and yellow signals, both flashing. However, upon depression of the accelerator, when the gear shift is in reverse and the motor is running, the said red reverse signals remain the same subject to switch 77, but since such acceleration closes gap 67 and switch 66 and opens gap 55 and switch 58, the illuminated signal is a flashing red and a stabilized green. If under this condition, the brake pedal is employed while in reverse gear, it does not change the operation since it would only change to produce a steady stabilized illumination of the red lights since the flasher in the circuit would be cancelled out by the steady stabilized red circuit, responsive directly to the battery.

It is to be observed that when the motor is not running so as to open the oil pressure switch 50, such as when a vehicle is at rest, nevertheless the red stop warning signal lamps 45 and 20 continue to be operable responsive to the brake, since that circuit when closed by the brake switch 72 is connected through lead 73 direct to battery power line 52. Thus the operator of a rearward vehicle is given a red warning that the vehicle ahead is occupied and may be operated either forwardly or rearwardly, even though the motor may not have been started or be running.

Switches exemplified in the drawing are illustrative of any suitable type of electrical contact switch, of which there are many commercially available.

Having described the invention, what is claimed as new and patentable is:

1. In a motor vehicle having an engine, an accelerator means therefor, and an oil-pressure pump operable for pumping oil when the engine is running, the combination therewith of an automatically operable signaling system, including an electrical circuit having an oil-pressure switch therein maintained open when the engine is not running, means to close said oil-pressure switch by the pressure of the oil pump, a visual caution signal and a visual acceleration signal in said circuit, a first signal switch in the circuit to the caution signal and maintained closed by the accelerator whereby said caution signal is energized immediately upon closing of the oil pressure switch, a second signal switch in said circuit maintained open by said accelerator when said first signal switch is closed, and said second signal switch being closable by accelerating-actuation of said accelerator, said first and second signal switches being connected in alternatively operating relation whereby the respective opening and closing of one of said respective switches effects opposite respective opening and closing of the other of said switches, and thereby alternatively energizes and de-energizes the respective caution signal and acceleration signal.

2. A vehicle signal system of the character described as set forth in claim 1 and in which the vehicle includes an instrument panel and there are pilot light signals on the instrument panel corresponding to each of the respective caution and accelerator signals, each of said pilot light signals having a branch subcircuit connected to the corresponding respective circuits of said caution signal and acceleration signal, the branch circuits being connected in said circuit between the said first and second signal switches, and said respective visual caution signal and acceleration signal.

3. An electrical circuit signaling system in combination with a motor vehicle having an engine provided with an oil-pressure pump and accelerator means, and a gearshift member having a position thereof for reverse movement of the vehicle, said electrical signal circuit including an oil-pressure switch maintained open when the engine is not running and closed by pressure of the oil pump when the engine is running, varying visual signals in said circuit for respectively indicating caution, and acceleration, and danger from reverse movement of the vehicle, switch means in said circuit for selectively energizing and de-energizing the caution and acceleration signals alternatively, a reverse switch in said circuit having make-and-break means operated by the gear-shift lever and being in a portion of said circuit independent of the switch means for the caution and acceleration signals, the reverse switch being closable by movement of the gear-shift member to the reverse-position thereof, said circuit through the reverse switch extending through the said visual danger signal, and a flasher in said danger signal circuit positioned between said switch and said visual danger signal.

4. An electric circuit signal system in motor vehicles as set forth in claim 3, and in which the vehicle has indicating pilot lights on the instrument panel corresponding to the visual indicating signals, and there are branch circuits leading from the circuits of the visual indicating signals to said pilot lights, the flasher in the circuit of the reverse signal light being between said reverse switch in said circuit and the said visual danger-reverse signal and pilot light for said danger signal.

5. An electric circuit signal system in motor vehicles as set forth in claim 4, and in which the vehicle has a wheel brake means and a brake circuit having a switch selectively opened and closed by said brake means independent of said oil-pressure switch, said circuit of the brake means, when closed, having a lead to and through said visual danger warning signal in common with said reverse-signal circuit, and said lead between the brake-operated switch and said visual danger signal having a branch circuit in common with the reverse signal and circuit extending to the pilot signal of the instrument board corresponding to said visual danger signal.

References Cited in the file of this patent

UNITED STATES PATENTS

| | | |
|---|---|---|
| 1,365,127 | Swartwout | Jan. 11, 1921 |
| 2,513,712 | Coombs | July 4, 1950 |
| 2,800,640 | Hebard et al. | July 23, 1957 |